US005970393A

United States Patent [19]

Khorrami et al.

[11] Patent Number: 5,970,393

[45] Date of Patent: Oct. 19, 1999

[54] INTEGRATED MICRO-STRIP ANTENNA APPARATUS AND A SYSTEM UTILIZING THE SAME FOR WIRELESS COMMUNICATIONS FOR SENSING AND ACTUATION PURPOSES

[75] Inventors: Farshad Khorrami, Brooklyn; Nirod K. Das, Farmingdale, both of N.Y.

[73] Assignees: Polytechnic University; Omnitek Research & Development Inc., both of Brooklyn, N.Y.

[21] Appl. No.: 08/806,565

[22] Filed: Feb. 25, 1997

[51] Int. Cl.[6] .......................... H04B 7/00

[52] U.S. Cl. .......................... 455/66; 340/825.54; 342/42; 343/700 MS; 343/701

[58] Field of Search .......................... 455/66, 73, 67.1; 324/72, 348, 349, 700; 342/42, 44, 51; 343/700 MS, 701, 702; 340/505, 572, 825.54, 870.31

[56] References Cited

U.S. PATENT DOCUMENTS 3,707,711 12/1972 Cole et al. .......................... 343/700 MS
3,852,755 12/1974 Works et al. .......................... 343/701
4,912,471 3/1990 Tyburski et al. .......................... 340/825.54
5,440,300 8/1995 Spillman, Jr. .......................... 340/825.54
5,461,385 10/1995 Armstrong .......................... 342/42

*Primary Examiner*—Nguyen Vo
*Assistant Examiner*—Sam Bhattacharya
*Attorney, Agent, or Firm*—Frommer Lawrence & Haug LLP; William S. Frommer; Dennis M. Smid

[57] ABSTRACT

A system utilizing a number of micro-strip antenna apparatus embedded in or mounted on the surface of a structure for enabling wireless communication of sensed and actuation signals. The micro-strip antenna apparatus may include smart materials or other substrates. If only a sensed operation is desired, the micro-strip antenna apparatus may be fabricated from only passive elements or materials. Furthermore, a micro-strip antenna apparatus is provided which enables simultaneous transmission/reception of sensing and actuation signals.

4 Claims, 8 Drawing Sheets

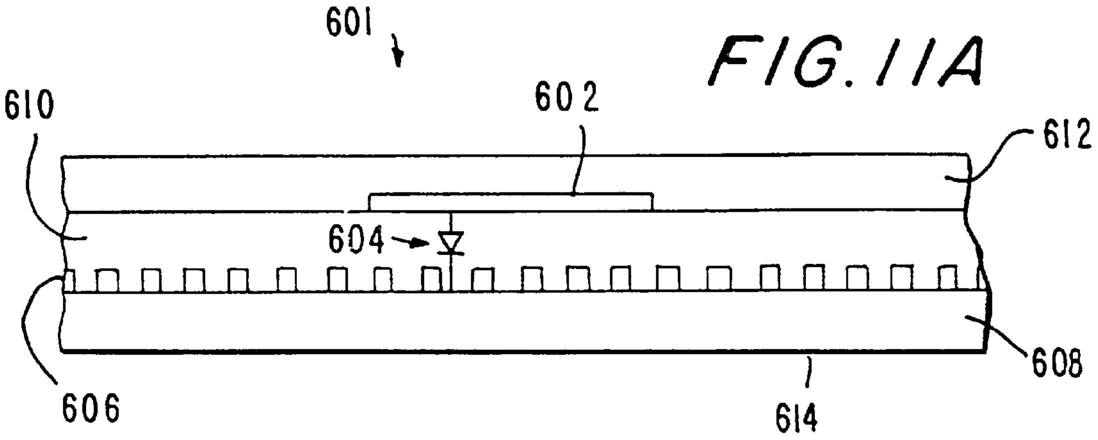
FIG. 11A
FIG. 11B
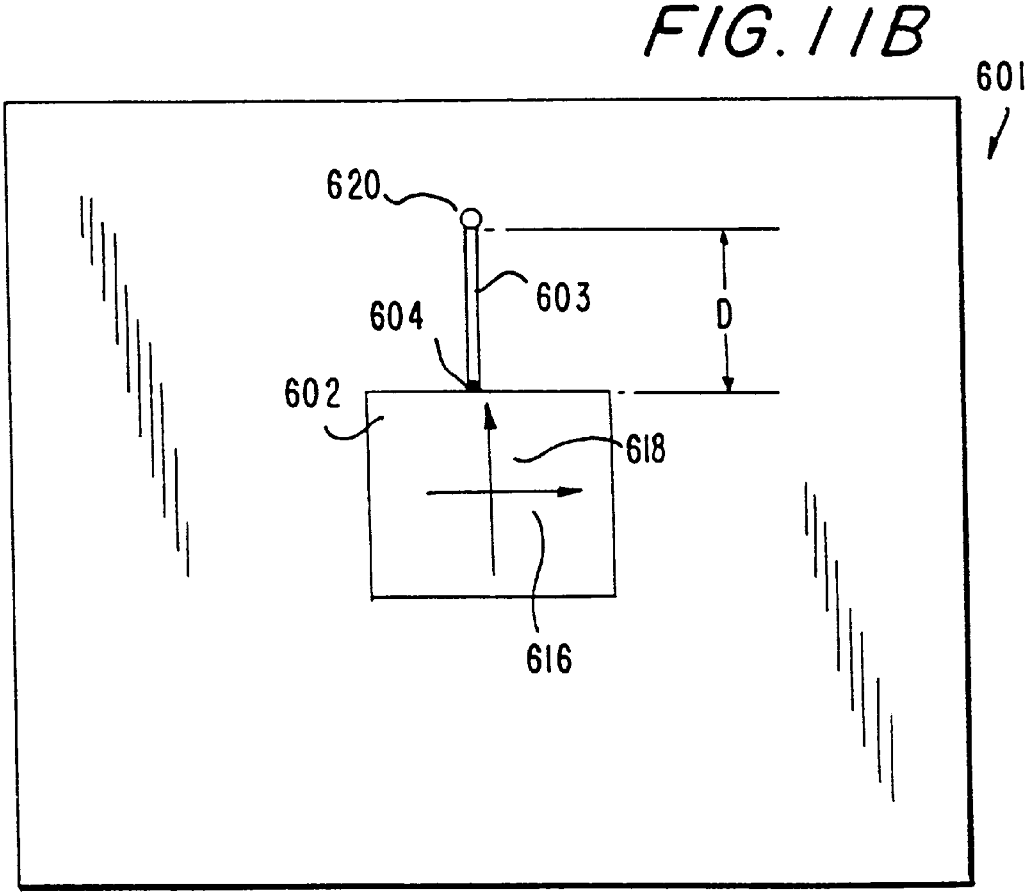

INTEGRATED MICRO-STRIP ANTENNA APPARATUS AND A SYSTEM UTILIZING THE SAME FOR WIRELESS COMMUNICATIONS FOR SENSING AND ACTUATION PURPOSES

BACKGROUND OF THE INVENTION

This invention relates to a micro-strip antenna apparatus and a wireless communication system utilizing such apparatus. More particularly, this invention relates to a micro-strip antenna apparatus having a number of antenna elements and arrays integrated with substrates of smart materials, such as piezoelectric devices, and to a system employing such apparatus for enabling wireless communication to and/or from smart structures.

A so-called smart patch may be surface mounted or embedded in a structure (such as helicopter rotor blades, high-speed machinery, and so forth). Such smart patch may include a sensor or sensors, an actuator or actuators, associated electronics, and/or a control circuit. A structure containing one or more smart patches is referred to as a smart structure.

Smart patches in a smart structure may operate as sensors so as to detect a predetermined characteristic (such as strain) of the respective structure. Additionally, such smart patches may operate as actuators so as to cause a predetermined force, torque, or the like, to be imposed on the respective structure. Ultimately, such smart patches may be utilized both as sensors and as actuators.

A significant concern in placing smart patches in or on smart structures involves power delivery and communications thereto. That is, power and/or signal lines are normally provided between each smart patch and a central control or processing device so as to enable power to be delivered to a desired number of the smart patches and to enable communication with such smart patches which may involve providing control signals thereto and/or to permit feedback signals to be received therefrom. As is to be appreciated, such use of power and/or signal lines may limit the application wherein smart patches may be effectively utilized, or may make the installation of smart patches into a structure relatively costly and difficult. Furthermore, inclusion of wires and signal lines in a structure may cause structural degradation and therefore rapid fatigue.

The present invention enables smart patches to receive power and/or transmit signals and/or communicate with a central control device without the use of power and/or signal lines. More particularly, in the present invention, smart patches may receive power signals and may communicate with the central control device in a wireless manner over a predetermined frequency range (such as a microwave frequency range). Accordingly, the above-described problems and/or disadvantages associated with power and signal lines may be eliminated with the present invention.

OBJECTS AND SUMMARY OF THE INVENTION

An object of the present invention is to provide a wireless communication system which enables a number of predetermined characteristics of a structure to be detected and a signal indicative of such detection to be supplied from the structure in a wireless manner.

Another object of the present invention is to provide a wireless communication system as aforesaid wherein a number of sensors each having an antenna, such as a micro-strip type antenna, are arranged in or on the structure.

A further object of the present invention is to provide a wireless communication system as aforesaid wherein each sensor includes only passive electronic devices. Furthermore, modulation and demodulation of signals may be achieved through inherent nonlinear characteristics of the material being utilized as a substrate for the microstrip antenna.

A still further object of the present invention is to provide a wireless communication system as aforesaid wherein a respective number of smart patches may be actuated to impose a force on the structure so as to cause a desired movement or deformation of the structure.

Yet another objective of the present invention is to enable power to be delivered to a smart structure by way of electromagnetic radiation (possibly in the microwave frequency range). The power delivery is achieved in a wireless manner by way of a control transceiver and a micro-strip antenna(s) located on the smart patches. The received power signal may be utilized in a substantially instantaneous manner or stored in an energy storage device such as a rechargeable thin-film battery or a capacitor bank or a combination thereof.

Another object of the present invention is to provide a microstrip antenna apparatus for performing simultaneous sensing and actuation operations. In this arrangement, a single antenna may be utilized not only to transmit a signal corresponding to a predetermined characteristic of the structure, but also to receive a power signal or a control signal for actuation operation.

A further object of the present invention is to provide a multi-layer antenna apparatus which may be utilized to achieve a relatively high level of actuation by increasing the amount of power that may absorb. This arrangement of a plurality of microstrip antennas may be obtained by having several patches on a substrate or having several patches on several vertical layers integrated with the smart material.

A still further object of the present invention is to provide arrangements of multi-layer microstrip antennas which achieve noise immunity and provide environmental protection of the microstrip antenna and the associated electronic circuitry. Furthermore, such multi-layer arrangements may provide relatively good impedance matching which may produce a relatively high efficiency of the microstrip antenna.

In accordance with an aspect of the present invention a wireless communication system is provided which comprises a number of sensors each having an antenna and being located on or within an element. Each of the sensors is adaptable to detect a respective predetermined characteristic of the element. The system further comprises a control transceiver device, operable to communicate in a wireless manner with the sensors, for supplying power to a desired number of the sensors so as to activate each respective antenna thereof and enable the desired sensor or sensors to detect the respective predetermined characteristic and to transmit an output signal indicative of the detected respective characteristic to the control transceiver.

The present invention is particularly beneficial in applications where health monitoring is essential and the structure of the device is degraded when wires are attached to the embedded or surface mounted sensors. The invention may also be applied to applications involving rotating machinery and the like where slip rings or other means are necessary to send signals back to a monitoring station.

The present invention enables wireless communication between sensors and actuators and/or powering of such sensors and actuators located on or within a structure. Power may be delivered to the sensors and actuators through the utilization of electromagnetic radiation in the radio frequency (possibly microwave) range. To this end, so-called microstrip antennas may be utilized. Such microstrip antennas may receive and transmit power simultaneously; therefore, not only may the power be collected by one antenna for actuation purposes, but also the same antenna may transmit a signal which may be used for structural health monitoring and/or feedback control purposes.

Microstrip antennas are relatively inexpensive and lightweight and may be utilized as radiating/receiving elements in radar and communication systems. Basically, a microstrip antenna may be fabricated by depositing/printing a small rectangular metallic patch on one side of a dielectric substrate, with the other side completely plated by a conducting plane. Such microstrip antennas may be fabricated in a variety of other shapes and sizes, such as those which may enable a microstrip antenna to be easily flushed mounted or arranged onto the body of a car, airplane, rotor blades, high speed machinery or the roof of a building. More complex geometries of microstrip antennas with multiple radiating elements, multiple substrate layers, or complex feed structure are obtainable as described herein so as to meet diverse design requirements. Such multilayer configurations can be integrated with electronics and other control circuitry on separate substrate layers that would allow advanced electronic beam steering, digital control and adaptive processing.

Further, the microstrip antenna elements may be integrated onto multilayered dielectric-piezoelectric substrates, along with other electronics and feed distribution circuits, for remote actuation and sensing of mechanical systems. The microstrip antennas would allow wireless communication with a distance transmitter. The power received can be used to remotely actuate the piezoelectric material. Furthermore, signals from the local piezoelectric sensors can be communicated via the microstrip antennas back to the remote station for monitoring and feedback control purposes. Embedded into the body material of a mechanical structure, and properly distributed over the entire body, such integrated designs enable smart structures to be dynamically monitored and controlled for desired performance by wireless means.

The present invention utilizes micro-strip antenna arrays integrated with piezoelectric (or other smart materials) substrates for enabling wireless communication in various applications such as smart structures. Furthermore, the present invention provides a totally passive antenna system which may be used for sensing operations.

The present invention may be utilized in passive (or active) sensing systems such as remote stress monitoring, electronic identification/tagging, security systems, transmission of signals when slip rings are required, and so forth. Additionally, the present invention may be utilized to perform actuation functions, such as in ultra-high accuracy measuring tools and devices, cutting tools, light-weight robotic manipulators, laser and other optical heads and probes, actuation and health monitoring of aircraft wings and rotor blades for helicopters, health monitoring of turbine blades, health monitoring and active vibration isolation for payloads requiring vibration isolation (e.g., microgravity experiments in space), and so forth.

Other objects, features and advantages according to the present invention will become apparent from the following detailed description of illustrated embodiments when read in conjunction with the accompanying drawings in which corresponding components are identified by the same reference numerals.

BRIEF DESCRIPTION OF THE DRAWINGS

FIGS. 11A and 11B are diagrams of a simultaneous sensing and actuating antenna for performing sensing and actuation functions according to an embodiment of the present invention.

DESCRIPTION OF THE PREFERRED EMBODIMENTS

Preferred embodiments of the present invention will now be described with reference to the accompanying drawings.

Figure 1:
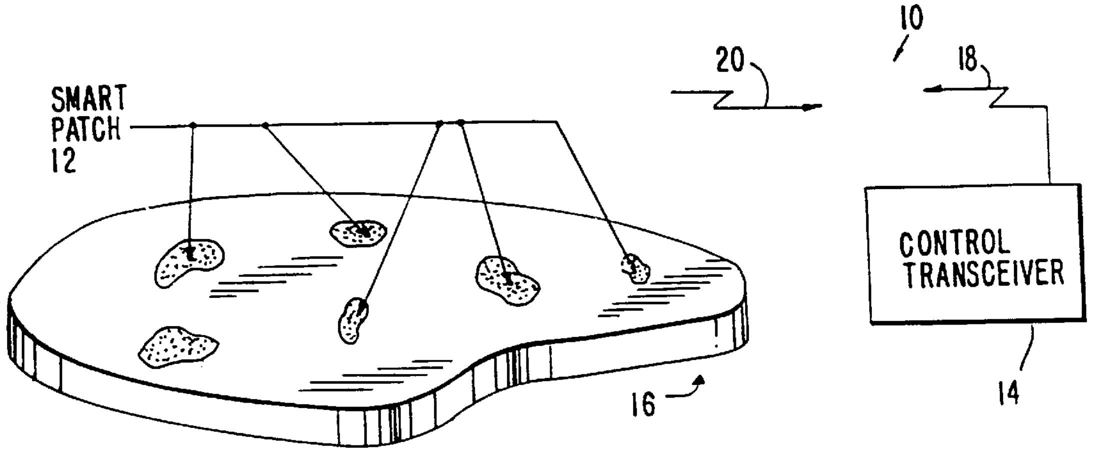
FIG. 1 is a diagram of a smart structure containing smart patches with a wireless communication system according to an embodiment of the present invention.
Figure 5:
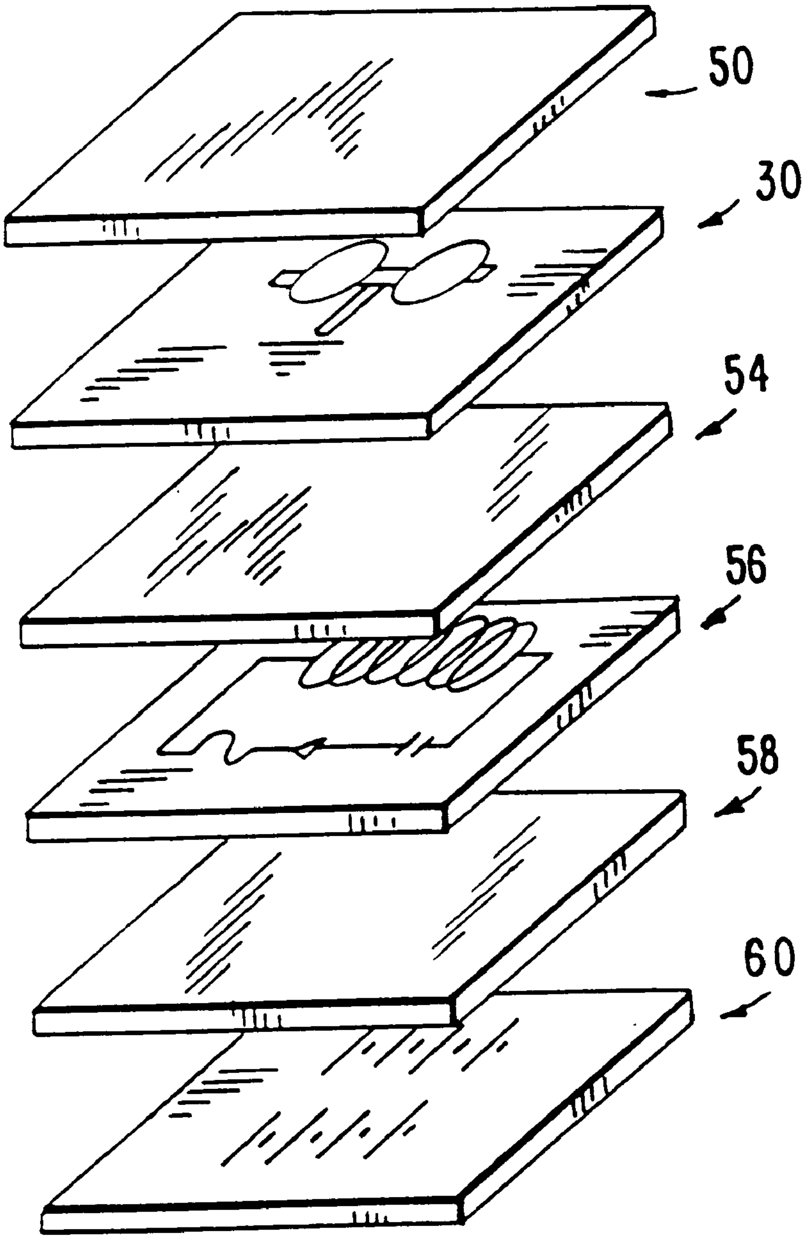
FIG. 5 is a diagram of a typical smart patch with integrated microstrip antennas, associated electronics, signal processing and control electronics, rechargeable thin-film batteries, and smart material according to an embodiment of the present invention.

FIG. 1 illustrates a smart structure communication system 10 consisting of a smart structure 16 which includes smart patches 12, such as those shown in FIG. 5 (i.e., an integrated set of sensors, actuators, electronics, signal processing and control hardware, and micro strip antennas). The smart structure communication system also contains a wireless transceiver system 14 which is adapted to communicate with the smart structure through a transmitting signal 18 and a receiving signal 20. The sensors and actuators in the smart patches 12 may be of active or smart materials such as piezoelectric ceramics. However, other active materials may be used such as electrorestrictive, shape memory alloys, ferro-electrics, bio-polymers and so-forth.

Figure 2:
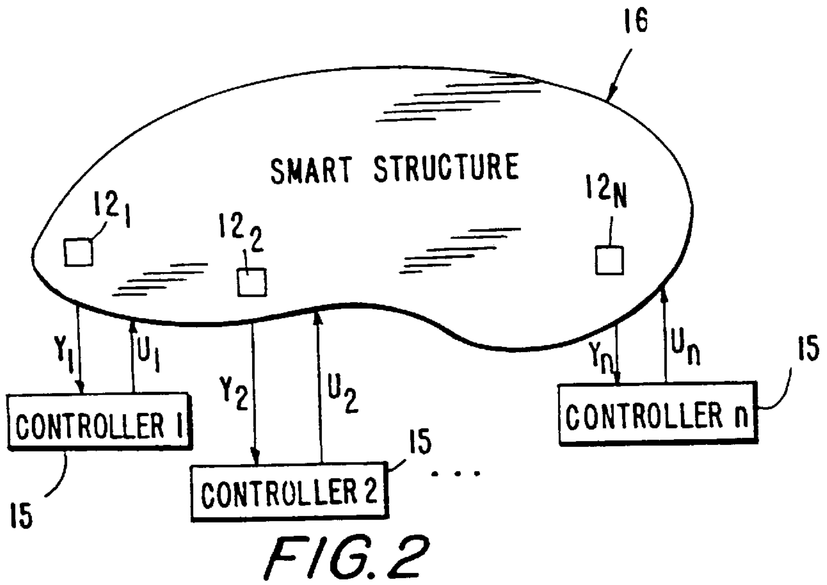
FIG. 2 is a diagram of the smart structure containing smart patches and a wireless communication system as in FIG. 1 with a particular structure of an associated control system.

FIG. 2 illustrates the smart structure 16 with the associated smart patches 12 and feedback controllers 15. Each of the feedback controllers is adapted to respectively receive input signals (yi), to perform a predetermined algorithm on the received signals, and to generate output signals (ui) which are supplied to the inputs to the system, such as the actuators on the smart patches of the structure. The feedback controllers may be implemented as part of the smart patches 12 or its action may be communicated through the control transceiver 14. Although the feedback controllers 15 are shown to have a decentralized structure, the present invention is not so limited. That is, the feedback controllers may be configured as a central computer which receives all the sensor signals and communicates back to all the actuators. This may also be achieved by use of the control transceiver. In other words, the processors may be on the smart structure 16 or removed therefrom at a remote location.

Figure 3A:
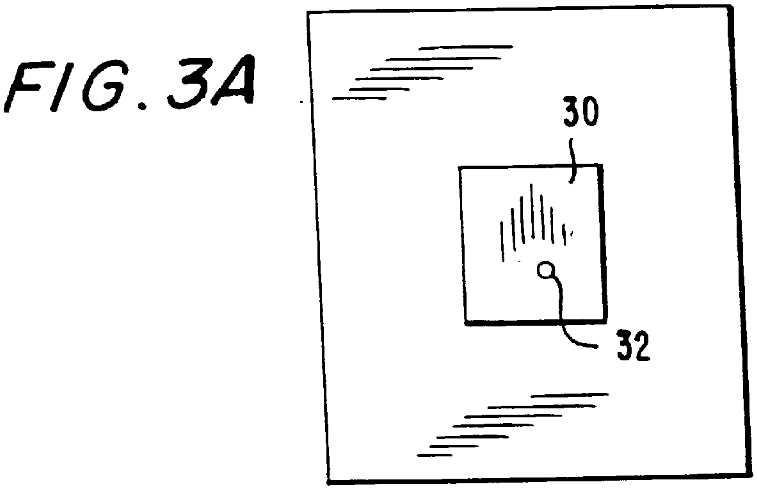
FIGS. 3A and 3B are diagrams of a microstrip antenna according to an embodiment of the present invention.
Figure 3B:
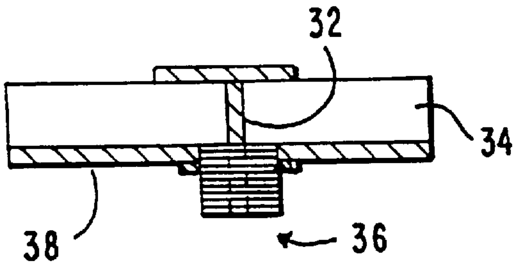

FIGS. 3A and 3B respectively illustrate top and side views of a micro-strip antenna 30 printed on a dielectric substrate 34. The dielectric substrate 34 has a ground plane 38 as one of its faces. The microstrip antenna is excited through probe feed 32 using a coaxial input 36. However, the present invention is not so limited. That is, other types of feed structure such as co-planar feeding may be used. Furthermore, the dielectric substrate 34 is preferably of an active material type such as piezoceramics that may be used for either sensing or actuation operation. Alternatively, other types of smart materials (such as electrorestrictive, magnetostrictive, etc.) may also be used. Instead of such single patch antenna, multiple patch antennas may be used on a single substrate as, for example, shown in FIG. 8.

Figure 4A:
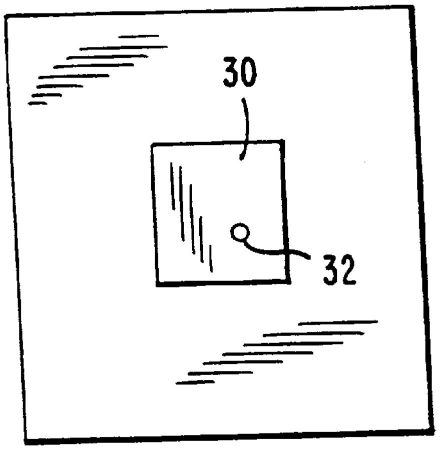
FIGS. 4A and 4B are diagrams of a microstrip antenna with a two layer piezoelectric-dielectric substrate arrangement according to another embodiment of the present invention.
Figure 4B:
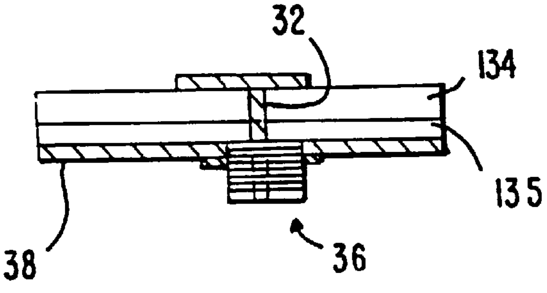

FIGS. 4A and 4B respectively illustrate top and side views of a two-layer dielectric-piezoelectric micro-strip antenna arrangement with a dielectric substrate 134 and a PZT (Lead Zirconate Titanate) substrate 135. This arrangement may be used to compensate for undesirable characteristics of the dielectric substrate 34 which reduces the radiation efficiency of the antenna. Such undesirable effects may include strong anisotropy, high dielectric constant, and high frequency losses. Further, instead of such single patch antenna, multiple patch antennas may be used on a single substrate as, for example, shown in FIG. 8.

The dimensions of the antenna 30, the location of the probe feed 32, the thickness and material properties of the substrate 34 determine the proper operation of the antenna. The length of the antenna should be about half the effective wavelength for resonant operation. The width and the location of the probe feed should be such so as to achieve proper impedance matching for maximum radiation efficiency. The thickness or the dielectric substrates may be selected to obtain the necessary bandwidth. For instance, to achieve an antenna with a 2.6 GHz resonant frequency, a 1.5 cm×1.5 cm patch may be deposited on a 0.02 inch thick duroid (approximately 2.5 inches×1.5 inches) bonded to a 0.02 inches thick piezoceramic (PZT 5H—approximately 2.5 inches×1.5 inches). The probe feed is to be located at 1 millimeter from one edge, centered about the other dimension. For the two-layer arrangement of FIG. 4 the thickness of the individual layers will have to be adjusted for proper radiation while allowing sufficient interaction of the radiation signals with the piezoelectric substrate. A computer-aided analysis of the complex geometry may be used for optimum performance. Furthermore, adjustable short stubs (metallic patches) attached to the microstrip antenna may be integrated into the design to further fine tune the radiation efficiency.

FIG. 5 illustrates an arrangement of the smart patch 12. As shown therein, such smart patch includes integrated microstrip antenna 30, associated electronics 56 and shield 54, signal processing and control electronics 56 and shield 58, thin-film batteries 60 (which may be rechargeable or non-rechargeable type), and smart material 50 according to an embodiment of the present invention. The smart patch 12 is limited to this arrangement. For example, the smart patch may include multiples of one or more of the above elements (e.g., multiple micro-strip antennas). Furthermore, other elements such as a bank of capacitors for storing charge may be included. Additionally, the micro-strip antenna 30 may be an integrated multi-layer type such as that shown in FIG. 6.

A two- or multi-layer antenna structure may be preferable over a single-layer antenna for several reasons. First, producing a microstrip antenna directly on a single-layered piezoelectric structure can be quite difficult and problematic. The high-dielectric constant of a piezoelectric substrate may result in a very low level of input radiation impedance, which can be difficult to match. Second, available piezoelectric substrates may be quite lossy at microwave frequencies, with poor reproducibility of their microwave characteristics. A two-layer arrangement with a dielectric substrate cascaded on top of a piezoelectric substrate minimizes such undesired effects by concentrating a major fraction of the fields in the dielectric region. In addition, as hereinafter discussed, for sensing applications, the two-layer arrangement provides a relatively simple and effective mechanism to combine and modulate the microwave signal across the antenna together with the low-frequency sensing signal across the piezoelectric substrate.

Figure 6A:
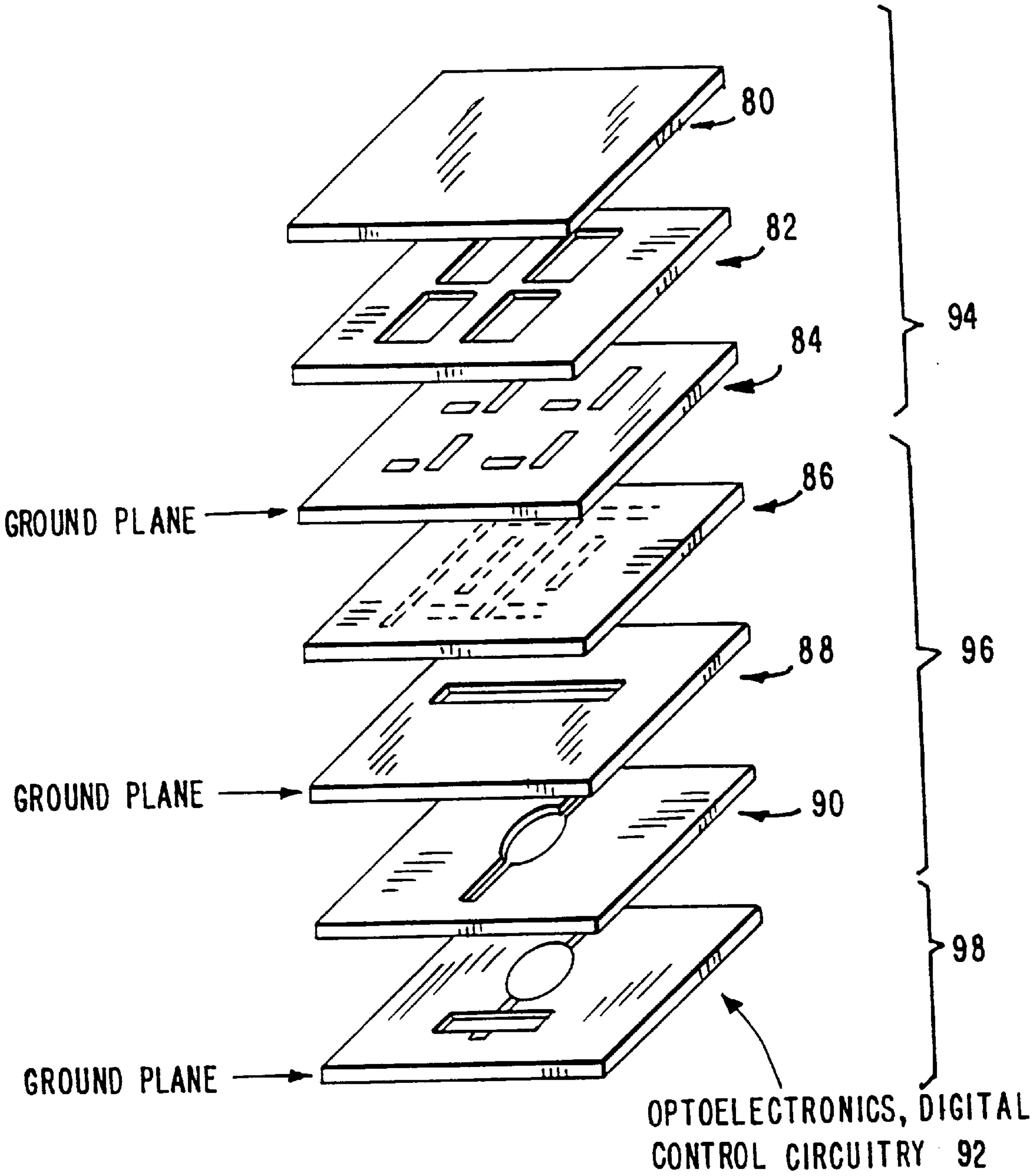
FIGS. 6A and 6B are diagrams of integrated microstrip antennas with at least one layer of antenna patches, protective radome, and required feed circuits and radio-frequency electronics according to an embodiment of the present invention.
Figure 6B:
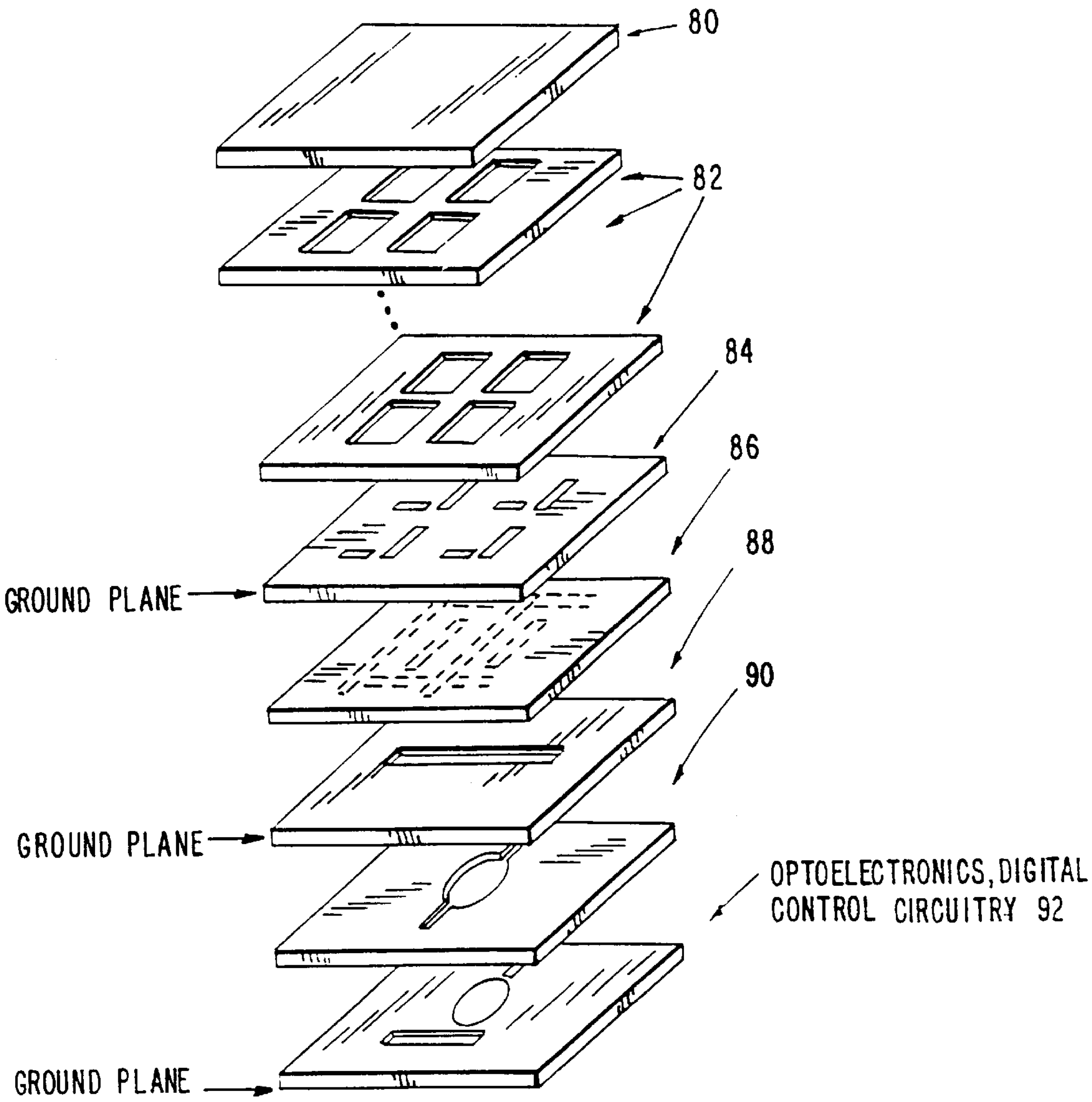

FIGS. 6A and 6B illustrate the integrated microstrip antennas 30 and their associated electronics. As shown therein, such antenna and electronics include three main parts: an antenna module 94, a multilayer microwave/radio-frequency circuit module (MMC) 96, and an antenna control module 98. More particularly, such antenna may include one or multiple layers of antenna patches 82, a protective radome 80, a primary feed network 86, active circuits and secondary feed network 90, and digital/optical control circuits 92. The antenna and primary feed network layers are coupled with each other through slots on the ground planes of an electromagnetic coupling layer 84. Similarly, the primary feed network 86 and the secondary feed network 96 are interconnected using a slotline coupling 88.

Figure 7:
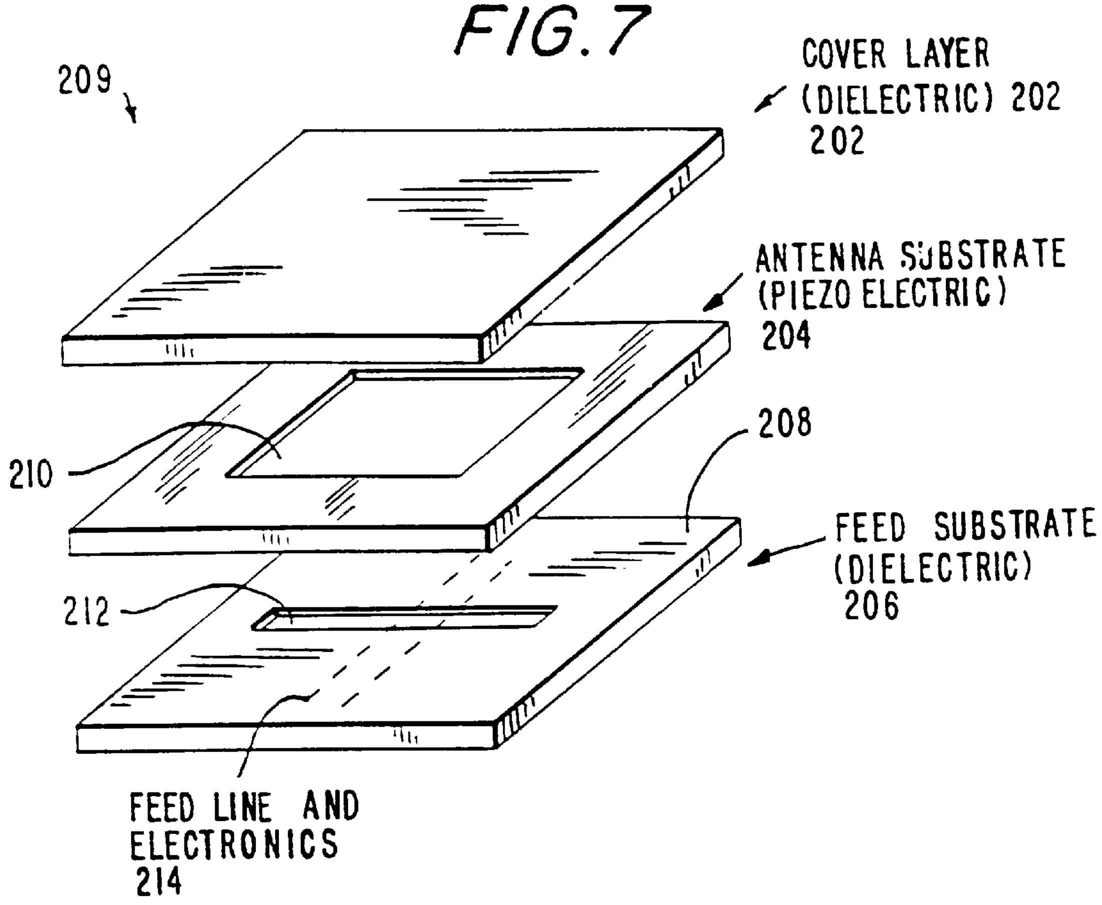
FIG. 7 is a diagram of a microstrip antenna with a separate feed and electronics layer/substrate which eliminates interference between electronics and radiation according to an embodiment of the present invention.

FIG. 7 illustrates an arrangement of an antenna 209. As shown therein, such antenna includes a microstrip antenna 210, which is printed on a substrate 204 and protected by a cover layer 202. This antenna arrangement further includes a feed substrate 206 which includes a separate feed and electronics layer/substrate 214 coupled to the antenna layer using a slot 212 etched on a common ground plane 208 between the antenna and the electronic layers. The isolation between feed and electronics layers eliminates interference between electronics and radiation.

Figure 8:
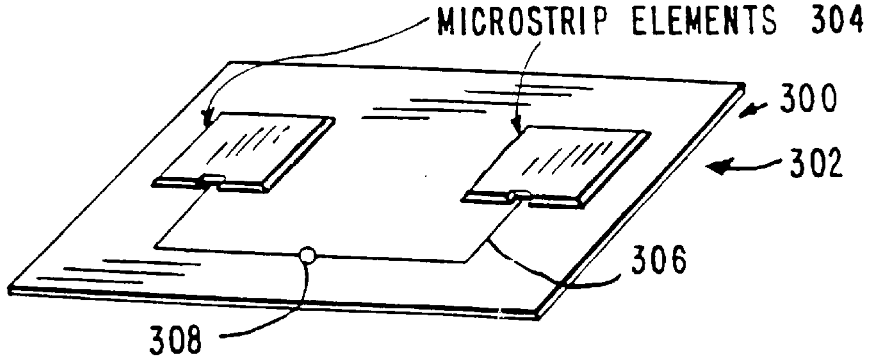
FIG. 8 is a diagram of a multi-element smart antenna according to an embodiment of the present invention.

FIG. 8 illustrates a multiple antenna patch arrangement. As shown therein, such arrangement includes multiple antenna patches 304, connected with the array input 308 using metal feed lines 306 so as to increase the received power level. Each microstrip antenna element 304 may be configured as in FIG. 4 with a duroid dielectric substrate 300 and a PZT substrate 302. The antenna elements 304 may be configured so as to have a single layer arrangement as in FIG. 3 or a multilayer arrangement as in FIG. 6.

Figure 9:
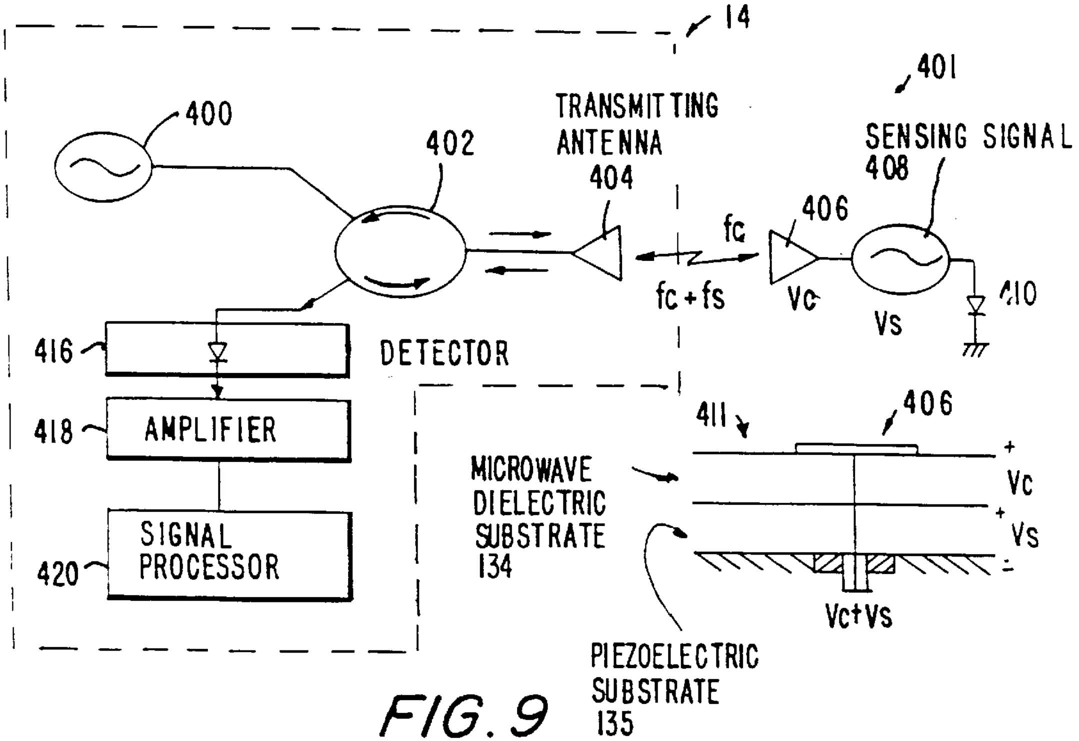
FIG. 9 is a diagram of a wireless communication system for sensing characteristics of a structure using a micro-strip sensing antenna according to an embodiment of the present invention.

FIG. 9 is a wireless communication system 401 for sensing characteristics of a structure (such as the structure 16) using a micro-strip sensing antenna 411. The sensing antenna 411 is a two-layer design as in FIG. 4. The wireless communication system 401 includes the control transceiver 14, a receiving antenna 406, and a non-linear element 410. The controlling transceiver subsystem includes a radio frequency signal source 400, a transceiver antenna 404, a circulator 402, a non-linear element (such as a diode) 416, a signal amplifier 418, and a signal processor 420. The signal received by the sensing antenna 411 from the microwave signal source 400 may be mixed with the piezoelectric sensing (e.g., vibration) signal by the non-linear element 410. It is to be appreciated that the nonlinear function of element 410 may be performed by the inherent radio-frequency non-linearity of the piezoelectric substrate of the antenna itself.

In FIG. 9, radio (possibly microwave) signal from an oscillator of frequency, $f_c$, tuned to the resonant operating frequency of the sensing antenna, may be radiated by a suitable antenna at a controlling base unit or the control transceiver 14. The radio signal is received by the sensing antenna at the other end, producing a received (microwave) voltage, $v_c$, across the output terminals of the sensing antenna. A sensing voltage, $v_s$, is generated across the piezoelectric substrate due to a response of the structure (e.g., mechanical vibration of the structure) on which the sensing antenna is mounted. The sensing voltage is added in series to the microwave signal $v_c$, due to the two-layer substrate arrangement of the sensing antenna. The non-linear element 410, which may be a microwave varactor diode or the substrate material itself, is connected across the antenna output in order to modulate the microwave and piezoelectric sensing signals. The modulated signal is then re-radiated through the same antenna back to the controlling base unit. The antenna at the base unit receives this modulated signal, which is channeled to a separate port through the circulator 402. A part of the transmitted oscillator signal is also reflected from the base-station antenna (due to imperfect mismatch of the base station antenna) and combined and mixed with the microwave-modulated sensing signal using the microwave diode 416. The low-frequency part of the mixed signal contains the sensing information, which is then amplified by the amplifier 418 and processed by the processor 420 for display and evaluation. It is appreciated that by using advanced signal processing, transmitter circuit and antenna design, and increased transmitter power, it would be possible to extend this sensing technique to large distances (such as several kilometers).

It may be noted, that the vibration of the sensing platform can result in a doppler effect, independent of the smart material (e.g., piezoelectric ceramic) sensing. This doppler information, which may have some correlation with the sensing signal, may not be a reliable measure of the internal mechanical stress. For example, a doppler component may not contain information about stress and vibration components in directions perpendicular to the microwave radiation, or large internal stress variation that produces only small physical displacements and vibration. Accordingly, it is preferable to filter the doppler component and background noise in order to clearly detect the sensing signal. If the transmitting radio frequency ($f_c$) is slightly shifted or perturbed, the corresponding doppler component would shift linearly with the change in the radio frequency; whereas, the sensing signal would remain unaffected by the small change in the radio frequency. This property can be strategically used for suitable signal processing, and enhanced detection and sensing.

The sensing antenna is preferably a passive device, which does not require any battery source for biasing and circuit operation. The only electronic component that may be used in the antenna 411 is a diode. It may be noted that the substrate itself (e.g., piezoceramic) exhibits some radio/microwave non-linearity of its real and/or imaginary part of the dielectric constant. This non-linearity can be effectively used for modulation purposes without the need for any additional electronic components. This would allow the realization of a single passive device without any additional electronics, which would perform radio/microwave reception from a remote control station, sensing and modulation with the microwave signal, and re-transmission of the modulated signal for detection at the remote control station.

Figure 10:
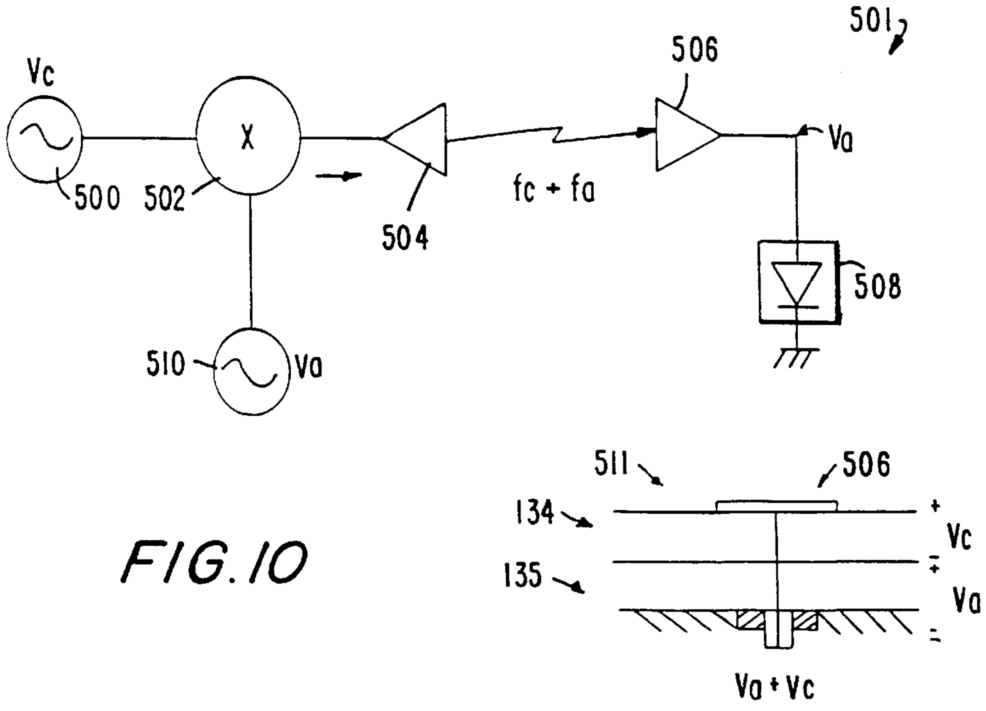
FIG. 10 is a diagram of a wireless communication system for actuation of a structure using a microstrip actuating antenna according to an embodiment of the present invention.

FIG. 10 is a wireless communication system 501 for actuation of a structure using a microstrip actuating antenna 506. Such system includes a microwave signal source 500, a control signal source 510, a modulator 502, a transmitting antenna 504 and a receiving antenna 506 which is part of an activation antenna 511. A control signal from the control signal source 510 is modulated by a radio-frequency (possibly in the microwave or millimeter wave range) signal from the microwave signal source 500 by the modulator 502 so as to form an activation signal which is transmitted by the transmitter antenna 504. The signal received by the actuation antenna 506 is converted to activation power signal using the non-linear element 508. The non-linear function of the element 508 can be implemented using an electronic diode or by the microwave non-linearity of a substrate used with the antenna. The substrate for the antenna may be piezoceramic.

In other words, FIG. 10 illustrates a system for performing an actuation operation by use of a wireless or remote device. The control signal, $v_a$, is modulated with a microwave carrier signal, $v_c$, of frequency, $f_c$, tuned to the resonant frequency of the actuator antenna. The received signal at the actuator antenna is demodulated by a non-linear element. A microwave diode may be used for such non-linear function, which alternatively may be performed by the microwave non-linearity of the piezoelectric substrate. The demodulated actuation signal, $v_a$, can then be fed back with some voltage shifting electronics (low power circuits) to the antenna input for actuation of the piezoelectric layer. Suitable DC-RF isolation mechanism may be used to isolate the RF and DC paths. If higher voltage levels are desired, the antenna may be properly designed for high input impedance and suitably matched to the non-linear device and piezoelectric input using microwave planar circuits.

FIGS. 11A and 11B respectively illustrate side and top views of a sensing and actuating antenna 601 which is adapted to simultaneously perform both sensing and actuation functions. This device includes a microstrip antenna 602, a protective radome 612, an antenna substrate 610, a strip grating layer 606, a piezoelectric layer 608, and a back ground plane 614. A non-linear element (such as electronic diode) 604 is used to convert modulated actuation signal to a base-band actuation signal. A feed-through connection 620 is used to short-circuit the antenna and the strip grating layer for the actuation mode of operation, so that the total actuation voltage can be applied across the piezoelectric substrate 608 for maximum effectiveness. A metal strip line 603 of length D equal to a quarter guide wavelength may be used so that the low-frequency actuation voltage of the antenna is short circuited to the strip grating layer 606 while, as desired, the actuation signal is not short-circuited. For the sensing mode of operation, the device uses a polarization direction 616 while a polarization direction 618 is used for actuation mode of operation. The strip grating layer 606 allows the radiation signal to pass through into the piezoelectric layer 608, which can interact and mix with the sensing signal generated by the piezoelectric substrate.

However, the actuation signal can not pass through the strip grating layer. The arrangement allows the actuation and sensing functions to be performed independently and simultaneously by the same device without interfering with each other.

The antenna 601 shown in FIGS. 11A and 11B is an integrated device that can perform the function of both remote (wireless) sensing and remote actuation. In the sensing mode of operation, the microwave signal from the control base station is transmitted with an E-field polarization perpendicular to the grating strips. For such polarization, the strip grating structure is transparent to the microwave radiation, and therefore the antenna behaves similar to the sensing antenna previously discussed. However, when the device is used for actuation, the microwave actuating signal is transmitted from the base station with an E-field polarization along the grating strips. For this polarization, the strip grating structure behaves like a nearly perfect reflector, and therefore may be replaced by a nearly perfect metal plane, which insulates the bottom piezoelectric substrate from the actuating microwave signal. After the microwave signal is received by the antenna 602, the additional strip-stub and diode arrangement connected to the antenna performs the demodulation of the low-frequency actuating signal from the microwave carrier. It may be observed that this demodulated actuating signal voltage (low-frequency signal) on the microstrip antenna 602 is short-circuited to the metal strip-grating layer through a via hole 620. As a result, all the voltage is applied across the piezoelectric substrate for maximum actuation. The operation of the antenna is similar to the operation of the sensor or actuator antennas previously discussed. The only difference is that the control transceiver for the sensing operation and that for the actuation operation will have to use distinctly different polarization of radiation. However, they should preferably use different frequencies in order to maintain higher degree of isolation between each other. The microstrip patch antenna should be designed properly such that the dimension along the individual polarization determines the corresponding frequency of operation.

Therefore, microstrip antenna elements may be integrated onto multilayered dielectric-piezoelectric substrates, along with other electronics and feed distribution circuits, for remote actuation and/or sensing of mechanical systems. The microstrip antennas may allow wireless communication with a distance transmitter. As a result, power may be supplied in a wireless manner to a desired number of smart patches so as to actuate the piezoelectric material included in such smart patches, thereby causing a force, torque, or the like to be imposed on the structure having the smart patches. Additionally, signals indicative of a sensed or detected predetermined characteristic of the structure from local piezoelectric sensors may be communicated via the microstrip antennas back to a remote station for monitoring and feedback control.

An article entitled "Utilization of Microstrip Antenna for Wireless Communication in Smart Structures" by Nirod K. Das et al., (in press), and presented at the NATO workshop on Smart Electronic Structures in Belgium, NATO Headquarters in November 1996 is hereby incorporated by reference.

An article entitled "Active Vibration Damping and Pointing of a Flexible Structure with Piezoceramic Stack Actuators" by F. Khorrami et al., in proceedings of the SPIE 1996 Symposium on Smart Structures and Materials, (San Diego, CA), February 1996 is hereby incorporated by reference.

Although preferred embodiments of the present invention and modifications thereof have been described in detail herein, it is to be understood that this invention is not limited to these embodiments and modifications, and that other modifications and variations may be affected by one skilled in the art without departing from the spirit and scope of the invention as defined by the appended claims.

What is claimed is:

1. An element for use in a system for monitoring and/or deforming a structure in a desired manner, said element having a single antenna and being located on or within said structure and being adaptable to operate simultaneously as a sensor device and an actuator device, in which said element monitors at least one predetermined characteristic of said structure when operating as a sensor device and in which said element causes said structure to deform in said desired manner when operating as an actuator, and, in which a modulated signal is transmitted to said element in a wireless manner so as to activate the antenna thereof and enable said element to monitor the at least one predetermined characteristic of said structure when operating as a sensor device and enable said element to cause said structure to deform in said desired manner when operating as an actuator, wherein the antenna is a micro-strip type antenna and said element includes a grating layer, and wherein the micro-strip type antenna has an operating frequency associated therewith in the microwave frequency range and includes a micro-strip patch and a metal-strip line having a predetermined dimension, said metal-strip line coupling said micro-strip patch to said grating layer so as to provide a short circuit condition at low frequencies and an open circuit condition at micro-wave frequencies.

2. An element as in claim 1, wherein said predetermined dimension is ¼ wavelength of the operating frequency.

3. An element as in claim 1, further having a substrate portion with a non-linear material characteristics and wherein the micro-strip type antenna further includes a non-linear device coupling the respective micro-strip patch to the respective substrate portion.

4. An element as in claim 1, wherein said substrate portion is a piezoelectric ceramic material.

* * * * *